(12) United States Patent
Okanishi et al.

(10) Patent No.: US 8,974,968 B2
(45) Date of Patent: Mar. 10, 2015

(54) COMPOSITE GRAPHITE PARTICLE FOR NONAQUEOUS SECONDARY BATTERY, NEGATIVE ELECTRODE MATERIAL CONTAINING THE SAME, NEGATIVE ELECTRODE AND NONAQUEOUS SECONDARY BATTERY

(75) Inventors: Kengo Okanishi, Kagawa (JP); Keita Yamaguchi, Kagawa (JP); Norikazu Yamamoto, Kagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 809 days.

(21) Appl. No.: 13/001,150

(22) PCT Filed: Jun. 24, 2009

(86) PCT No.: PCT/JP2009/061486
§ 371 (c)(1),
(2), (4) Date: Mar. 28, 2011

(87) PCT Pub. No.: WO2009/157478
PCT Pub. Date: Dec. 30, 2009

(65) Prior Publication Data
US 2011/0171532 A1 Jul. 14, 2011

(30) Foreign Application Priority Data
Jun. 25, 2008 (JP) ................................. 2008-166526

(51) Int. Cl.
*H01M 4/583* (2010.01)
*H01M 10/0525* (2010.01)
*C01B 31/04* (2006.01)
*H01M 4/133* (2010.01)
*H01M 4/587* (2010.01)
*H01M 4/62* (2006.01)
*H01M 4/36* (2006.01)

(52) U.S. Cl.
CPC ........... *H01M 10/0525* (2013.01); *C01B 31/04* (2013.01); *H01M 4/133* (2013.01); *H01M 4/587* (2013.01); *H01M 4/622* (2013.01); *H01M 4/366* (2013.01); *Y02E 60/122* (2013.01)
USPC .................................................... 429/231.8

(58) Field of Classification Search
CPC .... C01B 31/04; H01M 4/133; H01M 4/1393; H01M 4/583
See application file for complete search history.

(56) References Cited

U.S. PATENT DOCUMENTS

| | | | |
|---|---|---|---|
| 2006/0133980 A1 | 6/2006 | Nanba et al. | |
| 2007/0128518 A1* | 6/2007 | Uono et al. | 429/231.4 |
| 2009/0130561 A1* | 5/2009 | Matsumoto et al. | 429/231.8 |
| 2009/0202917 A1* | 8/2009 | Sotowa et al. | 429/311 |

FOREIGN PATENT DOCUMENTS

| | | |
|---|---|---|
| EP | 1 005 097 A1 | 5/2000 |
| EP | 1 939 971 A1 | 7/2008 |
| JP | 11 11918 | 1/1999 |
| JP | 2000 86343 | 3/2000 |
| JP | 2005 19397 | 1/2005 |

(Continued)

OTHER PUBLICATIONS

International Search Report Issued Sep. 15, 2009 in PCT/JP09/061486 filed Jun. 24, 2009.
Combined Chinese Office Action and Search Report Issued Dec. 26, 2012 in Patent Application No. 200980123666.3 (with English translation and English translation of Categories of Cited Documents).

(Continued)

*Primary Examiner* — Maria J Laios
(74) *Attorney, Agent, or Firm* — Oblon, McClelland, Maier & Neustadt, L.L.P.

(57) ABSTRACT

To provide a nonaqueous secondary battery exhibiting a sufficiently small charge/discharge irreversible capacity in the initial cycle, exhibiting an excellent charge acceptance and excellent cycle characteristics, even when the negative electrode material-containing active material layer on a current collector is highly densified so as to obtain a high capacity. A composite graphite particle for nonaqueous secondary batteries, which is a composite graphite particle (B) obtained by forming a spherical graphite particle (A) and a graphitized product of graphitizable binder, wherein the spherical graphite particle (A) is a specific graphite particle or the composite graphite particle satisfies (a) and/or (b):

(a) assuming that the cumulative 50% diameter (d50 size), 90% diameter (d90 size) and 10% diameter (d10 size) of the (A) by a laser diffraction method are D50(A), D90(A) and D10(A), respectively, and the cumulative 50% diameter (d50 size), 90% diameter (d90 size) and 10% diameter (d10 size) of the (B) by a laser diffraction method are D50(B), D90(B) and D10(B), respectively, the composite graphite particle satisfies all of (formula 1), (formula 2) and (formula 3):

$1.1 \leq D50(B)/D50(A) \leq 2.0$ (formula 1)

$1.1 \leq D90(B)/D90(A) \leq 2.4$ (formula 2)

$1.0 \leq D10(B)/D10(A) \leq 1.8$ (formula 3)

(b) assuming that the value of $110_{(A)}/004_{(A)}$ which is the ratio between 110 plane and 004 plane measured from XRD of the (A) is x and the value of $110_{(B)}/004_{(B)}$ which is the ratio between 110 plane and 004 plane measured from XRD of the (B) is y, the ratio z therebetween is defined by the following formula and z is from 1.2 to 3.5:

$z = y/x$.

19 Claims, No Drawings

(56) References Cited

FOREIGN PATENT DOCUMENTS

| | | |
|---|---|---|
| JP | 2005 149792 | 6/2005 |
| JP | 2008 305661 | 12/2008 |
| JP | 2009 158356 | 7/2009 |
| WO | WO 2005/078829 A1 | 8/2005 |
| WO | WO 2007/000982 A1 | 1/2007 |
| WO | WO 2007/055087 A1 | 5/2007 |
| WO | WO 2007/072858 A1 | 6/2007 |
| WO | 2008 084675 | 7/2008 |

OTHER PUBLICATIONS

Combined Office Action and Search Report issued May 29, 2013 in Chinese Patent Application No. 200980123666.3 with English language translation and English translation of categories of cited documents.

Japanese Office Action issued Oct. 15, 2013 in Patent Application No. 2009-147965 with English Translation.

Extended European Search Report issued on Aug. 27, 2014, in Patent Application No. 09770188.2.

* cited by examiner

COMPOSITE GRAPHITE PARTICLE FOR NONAQUEOUS SECONDARY BATTERY, NEGATIVE ELECTRODE MATERIAL CONTAINING THE SAME, NEGATIVE ELECTRODE AND NONAQUEOUS SECONDARY BATTERY

TECHNICAL FIELD

The present invention relates to a composite graphite particle for use in a nonaqueous secondary battery, a negative electrode material containing the composite graphite particle, a negative electrode formed using the negative electrode material, and a nonaqueous secondary battery having the negative electrode.

BACKGROUND ART

Recently, with miniaturization of electronic devices, demands for a high-capacity secondary battery are increasing. In particular, a nonaqueous secondary battery having a high energy density and excellent large-current charge/discharge characteristics as compared with a nickel-cadmium battery or a nickel-hydrogen battery is attracting attention.

As for the negative electrode material of a nonaqueous secondary battery, graphite is often used in view of cost, durability and capacity. However, when the active material layer containing a negative electrode material on a polar plate is highly densified so as to obtain a high capacity, there arises a problem that the charge/discharge irreversible capacity in the initial cycle increases, sufficient charge acceptance is not obtained, or cycle deterioration occurs prominently.

Patent Document 1 describes a production method of a carbon composite material, where a natural graphite and a binder are kneaded together to obtain a kneaded material and the kneaded material is subjected to primary heating at 700 to 1,500° C. to carbonize the binder and then to secondary heating at 2,400 to 3,000° C. to thereby simultaneously perform purification of the natural graphite and graphitization of the carbonized binder. However, in Patent Document 1, scaly or flaky natural graphite is envisaged as the starting material, and this is insufficient in terms of highly densifying the active material layer, decreasing the charge/discharge irreversible capacity, or satisfying the charge acceptance and cycle characteristics.

RELATED ART

Patent Document

Patent Document 1: JP-A-2000-086343 (the term "JP-A" as used herein means an "unexamined published Japanese patent application")

SUMMARY OF THE INVENTION

Problems that the Invention is to Solve

Under these circumstances, the present invention has been made, and an object of the present invention is to provide a battery exhibiting a sufficiently small charge/discharge irreversible capacity in the initial cycle, and exhibiting good charge acceptance and excellent cycle characteristics, even when the negative electrode material-containing active material layer on a current collector is highly densified so as to obtain a high capacity.

Means for Solving the Problems

As a result of intensive studies to attain the above-described object, the present inventors have found that a nonaqueous secondary battery capable of solving the above-described problems can be obtained by using, as the negative electrode material, a composite graphite particle having specific structure and physical properties, in which a composite of a spherical graphite particle and a graphitized binder are formed. The present invention has been accomplished based on this finding.

That is, the gist of the present invention resides in the followings.

(1) A composite graphite particle for nonaqueous secondary batteries, which is a composite graphite particle (B) obtained by forming a composite of a spherical graphite particle (A) and a graphitized product of graphitizable binder, wherein the composite graphite particle (B) satisfies at least one of (a) and (b):

(a) assuming that the cumulative 50% diameter (d50 size), 90% diameter (d90 size) and 10% diameter (d10 size) of the (A) by a laser diffraction method are D50(A), D90(A) and D10(A), respectively, and the cumulative 50% diameter (d50 size), 90% diameter (d90 size) and 10% diameter (d10 size) of the (B) by a laser diffraction method are D50(B), D90(B) and D10(B), respectively, the composite graphite particle satisfies all of (formula 1), (formula 2) and (formula 3):

$$1.1 \leq D50(B)/D50(A) \leq 2.0 \quad \text{(formula 1)}$$

$$1.1 \leq D90(B)/D90(A) \leq 2.4 \quad \text{(formula 2)}$$

$$1.0 \leq D10(B)/D10(A) \leq 1.8 \quad \text{(formula 3)}$$

(b) assuming that the value of $110_{(A)}/004_{(A)}$ which is the ratio between 110 plane and 004 plane measured from XRD of the (A) is x and the value of $110_{(B)}/004_{(B)}$ which is the ratio between 110 plane and 004 plane measured from XRD of the (B) is y, the ratio z therebetween is defined by the following formula and z is from 1.2 to 3.5:

$$z = y/x$$

(2) The composite graphite particle for nonaqueous secondary batteries as described in (1) above, wherein the composite graphite particle (B) further satisfies at least one of (c) and (d):

(c) the BET specific surface area is from 1.6 to 5.0 m²/g, the tap density is from 0.80 to 1.40 g/cm³, the average degree of circularity in the particle diameter range of 1.5 to 10 μm measured by a flow-type particle image analyzer is from 0.90 to 0.98, and the average degree of circularity in the particle diameter range of 10 to 40 μm is from 0.85 to 0.90; and (d) assuming that the value of the entire pore volume obtained by Hg porosimetry measurement of the (A) is p and the value of the entire pore volume obtained by Hg porosimetry measurement of the (B) is q, the ratio r therebetween is defined by the following formula and is from 0.5 to 1.0:

$$r = p/q$$

(3) The composite graphite particle for nonaqueous secondary batteries as described in (1) or (2) above, wherein when a binder is added to the composite graphite particle (B) and the mixture is coated on a metal current collector, dried and pressed to set an electrode density to 1.63 g/cm³ or more, the value p'/q' obtained by dividing the value p' of BET-specific surface area after pressing of the binder-containing active material layer formed on the metal current collector by the value q' of BET-specific surface area before pressing of the binder-containing active material layer formed on the metal current collector is from 1.5 to 2.5.

(4) A composite graphite particle for nonaqueous secondary batteries, which is a composite graphite particle (B) obtained by forming a composite of a spherical graphite particle (A) and a graphitized product of graphitizable binder, wherein the spherical graphite particle (A) contains a plurality of flake or vein graphites that are curved or bent and the cumulative 50% diameter (d50 size) thereof by a laser diffraction method is from 9 to 14 μm.

(5) A negative electrode material for nonaqueous secondary batteries, comprising the composite graphite particle (B) for nonaqueous secondary batteries described in any one of (1) to (4) above.

(6) The negative electrode material for nonaqueous secondary batteries as described in (5) above, which further comprises a carbonaceous particle differing in the shape or physical property from the composite graphite particle (B).

(7) A negative electrode for nonaqueous secondary batteries, which is a negative electrode comprising a current collector and an active material layer formed thereon, wherein the active material layer is formed using the negative electrode material for nonaqueous secondary batteries described in (5) or (6) above.

(8) A nonaqueous secondary battery comprising positive and negative electrodes capable of storing/releasing lithium ion and an electrolyte, wherein the negative electrode is the negative electrode for nonaqueous secondary batteries described in (7) above.

Advantage of the Invention

When the composite graphite particle for nonaqueous secondary batteries of the present invention is used, a nonaqueous secondary battery exhibiting a sufficiently small charge/discharge irreversible capacity in the initial cycle, and exhibiting a high capacity, excellent charge acceptance and good cycle characteristics, even when the active material layer on a current collector of the negative electrode is highly densified, can be provided.

MODE FOR CARRYING OUT THE INVENTION

The best mode for carrying out the present invention is described in detail below, but the following descriptions of constituent requirements of the invention are an example (a representative example) of the embodiment of the present invention, and the present invention is not limited to these modes as long as the gist thereof is observed.

In the present invention, the terms are defined or used as follows. That is, in the composite graphite particle of the present invention, a portion where a carbonaceous particle is calcined at a graphitizable temperature is sometimes referred to as a graphite particle. The composite graphite particle of the present invention, including those mixed with, if desired, a carbonaceous particle, is defined as the negative electrode material. One having at least an active material layer on a current collector for a negative electrode, in which the active material layer is obtained using at least a negative electrode material and a binder, is defined as a polar plate or a negative electrode. A nonaqueous secondary battery is configured to comprise at least a negative electrode, a positive electrode and an electrolyte.

[1] Composite Graphite Particle for Nonaqueous Secondary Batteries (A) Configuration of Composite Graphite Particle The negative electrode material of the present invention uses the composite graphite particle of the present invention as the main component. The composite graphite particle of the present invention is a composite graphite particle (B) where a composite of a spherical graphite particle (A) and a graphitized product of graphitizable binder (hereinafter sometimes simply referred to as a "binder") is formed, and this is obtained, for example, by kneading a spherical graphite particle and a graphitizable binder and subjecting a shaped product of the kneaded material to pulverization and then graphitization or to graphitization and then pulverization or grinding. That is, in this case, the formed composite graphite particle is configured to have a structure where a composite of a calcined binder (this is also graphite) and a composite graphite particle in at least a part (a part or the entirety) of the graphite particle resulting from calcination of a carbonaceous particle, is formed.

The composite graphite particle in a first embodiment of the present invention is a composite graphite particle (B) obtained by forming a composite of a spherical graphite particle (A) and a graphitized product of graphitizable binder, wherein the composite graphite particle satisfies at least one of the following (a) and (b).

The composite graphite particle in a second embodiment of the present invention is a composite graphite particle (B) obtained by forming a composite of a spherical graphite particle (A) and a graphitized product of graphitizable binder, wherein the spherical graphite particle (A) is composed of a plurality of flake or vein graphites that are curved or bent and the cumulative 50% diameter (d50 size) thereof by a laser diffraction method is from 9 to 14 μm.

The carbonaceous particle as a raw material of the composite graphite particle of the present invention is not particularly limited as long as it is a carbon particle capable of being graphitized by calcination, but examples thereof include natural graphite, artificial graphite, spheroidized graphite, coke powder, needle coke powder and resin carbide powder. Among these, natural graphite is preferred in that the density of an active material layer can be easily increased at the preparation of the active material layer. In particular, spheroidized graphite obtained by spheroidizing graphite is preferably used.

The spherical graphite particle in the first embodiment of the present invention is preferably composed of a plurality of flake or vein graphites that are curved or bent. The graphitizable binder is as follows.

1) Graphitizable Binder

The "graphitizable binder" is not particularly limited as long as it is a carbonaceous material capable of being graphitized by calcination, and petroleum-type and coal-type fused polycyclic aromatics, including a tar, a soft pitch and a hard pitch, are preferably used. Specific examples thereof include a coal-type heavy oil such as impregnating pitch, binder pitch, coal tar pitch and coal-liquefied oil, and a petroleum-type heavy oil such as straight-run heavy oil (e.g., asphaltene) and cracked heavy oil (e.g., ethylene heavy end tar).

The content of a quinoline-insoluble component contained in the binder is usually from 0 to 10 mass %, but a smaller content is more preferred in view of hardness or capacity of a battery produced. If the content of a quinoline-insoluble component in the binder is excessively large, the strength of the obtained composite graphite particle becomes high and even when the active material layer coated on a current collector is pressed, the particle is unlikely to be deformed, making high densification difficult. Also, the capacity sometimes decreases.

Physical Properties of Composite Graphite Particle:

The composite graphite particle in the first embodiment of the present invention at least satisfies at least one of the following requirements (a) and (b):

(a) assuming that the cumulative 50% diameter (d50 size), 90% diameter (d90 size) and 10% diameter (d10 size) of (A) by a laser diffraction method are D50(A), D90(A) and D10(A), respectively, and the cumulative 50% diameter (d50 size), 90% diameter (d90 size) and 10% diameter (d10 size) of (B) by a laser diffraction method are D50(B), D90(B) and D10(B), respectively, the composite graphite particle satisfies (formula 1), (formula 2) and (formula 3):

$$1.1 \leq D50(B)/D50(A) \leq 2.0 \quad \text{(formula 1)}$$

$$1.1 \leq D90(B)/D90(A) \leq 2.4 \quad \text{(formula 2)}$$

$$1.0 \leq D10(B)/D10(A) \leq 1.8 \quad \text{(formula 3)}$$

(b) assuming that the value of $110_{(A)}/004_{(A)}$ which is the ratio between 110 plane and 004 plane measured from XRD of (A) is x and the value of $110_{(B)}/004_{(B)}$ which is the ratio between 110 plane and 004 plane measured from XRD of (B) is y, the value of y/x is from 1.2 to 3.5:

In addition to these requirements, the composite graphite particle in the first embodiment of the present invention preferably satisfies at least one of the following requirements (c) and (d):

(c) the BET specific surface area is from 1.6 to 5.0 m$^2$/g, the cumulative 50% diameter (d50 size) by a laser diffraction method is from 10.5 to 18.0 μm, the tap density is from 0.80 to 1.40 g/cm$^3$, the average degree of circularity in the particle diameter range of 1.5 to 10 μm measured by a flow-type particle image analyzer is from 0.90 to 0.98, and the average degree of circularity in the particle diameter range of 10 to 40 μm is from 0.85 to 0.90; and (d) assuming that the value of the entire pore volume obtained by Hg porosimetry measurement of (A) is p and the value of the entire pore volume obtained by Hg porosimetry measurement of (B) is q, the ratio r therebetween is defined by the following formula and is from 0.5 to 1.0:

$$r = p/q$$

The composite graphite particle in the second embodiment of the present invention also preferably satisfies at least one of the requirements (a) and (b) and preferably further satisfies at least one of the requirements (c) and (d). Furthermore, the spherical graphite particle used in the second embodiment of the present invention preferably has the following physical properties.

(i) Spherical Graphite Particle

The cumulative 50% diameter (d50 size) of the spherical graphite particle by a laser diffraction method is preferably 9.0 μm or more, more preferably 9.5 μm or more, and is preferably 14 μm or less, more preferably 13.5 μm or less, still more preferably 13.0 μm or less.

The cumulative 10% diameter (d10 size) by a laser diffraction method is preferably 4.0 μm or more, more preferably 4.5 μm or more, still more preferably 5.0 μm or more, and is preferably 9.0 μm or less, more preferably 8.5 μm or less, still more preferably 8.0 μm or less. The cumulative 90% diameter (d90 size) by a laser diffraction method is preferably 14.0 μm or more, more preferably 14.5 μm or more, still more preferably 15.0 μm or more, and is preferably 21.0 μm or less, more preferably 20.5 μm or less, still more preferably 20.0 μm or less. The definitions and measuring method of d50 size, d10 size and d90 size are as described later.

The composite graphite particle can be more optimized by using a spherical graphite particle in the range described below. The tap density is preferably 0.4 g/cm$^3$ or more, more preferably 0.5 g/cm$^3$ or more, still more preferably 0.6 g/cm$^3$ or more, and is preferably 1.0 g/cm$^3$ or less, more preferably 0.95 g/cm$^3$ or less, still more preferably 0.91 g/cm$^3$ or less. The BET-specific surface area is preferably 5.0 m$^2$/g or more, more preferably 6.0 m$^2$/g or more, still more preferably 6.5 m$^2$/g or more, and is preferably 11.0 m$^2$/g or less, more preferably 9.5 m$^2$/g or less, still more preferably 9.1 m$^2$/g or less. Incidentally, the definitions and measuring methods of these are as described later.

The R value (Raman R value) of the spherical graphite particle, which is a ratio of the scattering intensity at 1,360 cm$^{-1}$ to the scattering intensity at 1,580 cm$^{-1}$ in an argon ion laser spectrum using argon ion laser light at a wavelength of 514.5 nm, is preferably 0.1 or more, more preferably 0.15 or more, and is preferably 0.3 or less, more preferably 0.25 or less.

Incidentally, as for the Raman R value in the present invention, the intensity ratio $I_B/I_A$ between the intensity $I_A$ of a maximum peak in the vicinity of 1,580 cm$^{-1}$ and the intensity $I_B$ of a maximum peak in the vicinity of 1,360 cm$^{-1}$ in a Raman spectrum obtained by the later-described Raman measurement is defined as the Raman R value.

The maximum peak in the vicinity of 1,580 cm$^{-1}$ is a peak derived from a graphite crystalline structure, and the maximum peak in the vicinity of 1,360 cm$^{-1}$ is a peak derived from a carbon atom reduced in the symmetry property due to a structural defect.

In the Raman measurement, a Raman spectrometer, "Raman Spectrometer manufactured by JASCO Corp.", is used and after filling the sample in the measurement cell by causing the particle measured to naturally fall, the measurement is performed while irradiating argon ion laser light in the measurement cell and rotating the measurement cell in a plane perpendicular to the laser light. Measurement conditions are as follows.

Wavelength of argon ion laser light: 514.5 nm
Laser power on sample: from 15 to 25 mW
Resolution: 14 cm$^{-1}$
Measured range: from 1,100 to 1,730 cm$^{-1}$
Measurement of peak intensity, measurement of peak half-value width: Background processing, smoothing processing (simple average: 5 points in convolution)

The spherical graphite particle as a raw material of the composite graphite particle of the present invention is preferably a graphite particle passed through a spheroidization treatment. As to the apparatus used in the spheroidization treatment, for example, an apparatus of repeatedly applying a mechanical action, mainly impact force, including interaction of particles, such as compression, friction and shear force, to the particle may be used. Specifically, an apparatus with a rotor having a large number of blades provided inside a casing, where a surface treatment is performed by applying a mechanical action such as impact compression, friction and shear force to the carbon material introduced into the inside by rotating the rotor at a high speed, is preferred. Also, an apparatus having a mechanism of repeatedly applying a mechanical action by circulating a carbon material is preferred. Preferred examples of the apparatus include Hybridization System (manufactured by Nara Machinery Co., Ltd.), Krypton (manufactured by Earth Technica Co., Ltd.), CF Mill (manufactured by Ube Industries, Ltd.), Mechanofusion System (manufactured by Hosokawa Micron Corporation), and Theta Composer (manufactured by Tokuju Corp.). Among these, Hybridization System manufactured by Nara Machinery Co., Ltd. is preferred. In the case of performing the treatment by using this apparatus, the peripheral velocity of the rotating rotor is preferably set to from 30 to 100 m/sec, more preferably from 40 to 100 m/sec, still more preferably from 50 to 100 m/sec. The treatment may be performed only by merely passing a carbonaceous material through the apparatus but is preferably performed by causing a carbonaceous material to circulate or reside in the apparatus for 30 seconds or more, more preferably by causing a carbonaceous material to circulate or reside in the apparatus for 1 minute or more.

The average degree of circularity of the spherical graphite particle is usually 0.85 or more, preferably 0.9 or more, and is usually 1.0 or less, preferably 0.96 or less. If the average degree of circularity of the carbonaceous particle is less than the lower limit above, the degree of orientation is likely to decrease, whereas if it exceeds the upper limit, a cost rise is liable to result. As for the average degree of circularity of the spherical graphite particle, a value measured in the same manner as the average degree of circularity of the above-described negative electrode material is used.

These requirements are described in more detail below.

Requirement (1-a):

"Assuming that the cumulative 50% diameter (d50 size), 90% diameter (d90 size) and 10% diameter (d10 size) of the spherical graphite particle (A) by a laser diffraction method are D50(A), D90(A) and D10(A), respectively, and the cumulative 50% diameter (d50 size), 90% diameter (d90 size) and 10% diameter (d10 size) of the composite graphite particle (B) by a laser diffraction method are D50(B), D90(B) and D10(B), respectively, the composite graphite particle satisfies (formula 1), (formula 2) and (formula 3):

$$1.1 \leq D50(B)/D50(A) \leq 2.0 \quad \text{(formula 1)}$$

$$1.1 \leq D90(B)/D90(A) \leq 2.4 \quad \text{(formula 2)}$$

$$1.0 \leq D10(B)/D10(A) \leq 1.8 \quad \text{(formula 3)}"$$

(I) Definition of "Cumulative 50% Diameter, Cumulative 90% Diameter and Cumulative 10% Diameter"

The "cumulative 50% diameter, cumulative 90% diameter and cumulative 10% diameter" are a volume-based diameter determined by laser scattering particle size distribution measurement, and their measuring method is as follows.

A composite graphite particle (0.01 g) is suspended in 10 mL of a 0.2 mass % aqueous solution of polyoxyethylene sorbitan monolaurate (for example, Tween 20 (registered trademark)) which is a surfactant, the suspension is introduced into a commercially available laser diffraction/scattering-type particle size distribution measuring apparatus (for example, "LA-920, manufactured by HORIBA Ltd.") and irradiated with an ultrasonic wave of 28 kHz at a power output of 60 W for 1 minute, and the diameters measured thereafter as the volume-based cumulative 50% diameter, cumulative 90% diameter and cumulative 10% diameter in the measuring apparatus are defined as the volume-based cumulative 50% diameter, cumulative 90% diameter and cumulative 10% diameter of the present invention.

(II) Definition of the Cumulative 50% Diameter Ratio, Cumulative 90% Diameter Ratio and Cumulative 10% Diameter Ratio Between Spherical Graphite Particle and Composite Core Graphite Particle In the present invention, assuming that the cumulative 50% diameter, cumulative 90% diameter and cumulative 10% diameter of the spherical graphite particle (A) are D50(A), D90(A) and D10(A), respectively, and the cumulative 50% diameter, cumulative 90% diameter and cumulative 10% diameter of the composite graphite particle (B) are D50(B), D90(B) and D10(B), respectively, the ratios therebetween are defined as follows:

Cumulative 50% diameter ratio $1.1 \leq D50(B)/D50(A) \leq 2.0$

Cumulative 90% diameter ratio $1.1 \leq D90(B)/D90(A) \leq 2.4$

Cumulative 10% diameter ratio $1.0 \leq D10(B)/D10(A) \leq 1.8$ (III) Range

In the present invention, the cumulative 50% diameter ratio D50(B)/D50(A) is preferably 1.1 or more, more preferably 1.2 or more, and is preferably 2.0 or less, more preferably 1.7 or less. The cumulative 90% diameter ratio D90(B)/D90(A) is preferably 1.1 or more, more preferably 1.2 or more, and is preferably 2.4 or less, more preferably 2.0 or less. The cumulative 10% diameter ratio D10(B)/D10(A) is preferably 1.0 or more, more preferably 1.2 or more, and is preferably 1.8 or less, more preferably 1.6 or less.

If the cumulative 50% diameter ratio, cumulative 90% diameter ratio and cumulative 10% diameter ratio are small, a granulation effect and in turn, a sufficiently high charge acceptance expected may not be obtained, whereas if the cumulative 50% diameter ratio, cumulative 90% diameter ratio and cumulative 10% diameter ratio are excessively large, the pressing load when highly densifying the electrode is increased and spring back is liable to occur, as a result, a high density state of the electrode may not be maintained.

Requirement (1-b):

"Assuming that the value of $110_{(A)}/004_{(A)}$ which is the ratio between 110 plane and 004 plane measured from XRD of the spherical graphite particle (A) is x and the value of $110_{(B)}/004_{(B)}$ which is the ratio between 110 plane and 004 plane measured from XRD of the composite graphite particle (B) is y, the ratio z therebetween is defined by the following formula and z is from 1.2 to 3.5:

$$z=y/x"$$

(I) Measuring Method of Graphite Crystal Orientation Ratio

Charts of (110) plane and (004) plane of graphite are measured by powder X-ray diffraction and after peak separation is performed through fitting of the measured chart by using the asymmetric Peason VII as a profile function, integrated peak intensities of (110) plane and (004) plane are calculated. From the obtained integrated intensities, the ratio represented by "$I_{110}/I_{004}$" is calculated and defined as the graphite crystal orientation ratio.

The conditions of powder X-ray diffraction measurement are as follows. Here, "$2\theta$" indicates the diffraction angle.

Target: Cu (Kα ray) graphite monochrometer

Slit: divergence slit=1°, receiving slit=0.1 mm, scattering slit=1°

Measurement range and step angle/measurement time:
(110) plane: $76.5° \leq 2\theta \leq 78.5°$, 0.01°/3 sec
(004) plane: $53.5° \leq 2\theta \leq 56.0°$, 0.01°/3 sec (II) Definition of Ratio Between Graphite Crystal Orientation Ratio of Spherical Graphite Particle and Graphite Crystal Orientation Ratio of Composite Graphite Particle In the present invention, assuming that the value of graphite crystal orientation ratio of the spherical graphite particle (the value of $110_{(A)}/004_{(A)}$) is x and the value of graphite crystal orientation ratio of the composite graphite particle (the value of $110_{(B)}/004_{(B)}$) is y, the ratio z therebetween is defined by the following formula:

$$z=y/x$$

(III) Range

In the present invention, the ratio z between the graphite crystal orientation ratio of the spherical graphite particle and the graphite crystal orientation ratio of the composite graphite particle is preferably 1.2 or more, more preferably 1.5 or more, and is preferably 3.5 or less, more preferably 3.2 or less.

If the ratio between the graphite crystal orientation ratio of the spherical graphite particle and the graphite crystal orientation ratio of the composite graphite particle is too low, cycle deterioration caused due to the repeating of charge and discharge may become serious, whereas if the ratio between the graphite crystal orientation ratio of the spherical graphite particle and the graphite crystal orientation ratio of the composite graphite particle is excessively high, the pressing load when highly densifying the electrode is increased and spring back of the electrode is liable to occur, as a result, a high density state of the electrode may not be maintained.

Requirement (1-c)

"The BET specific surface area is from 1.6 to 5.0 m$^2$/g, the tap density is from 0.80 to 1.40 g/cm$^3$, the average degree of circularity in the particle diameter range of 1.5 to 10 µm measured by a flow-type particle image analyzer is from 0.90 to 0.98, and the average degree of circularity in the particle diameter range of 10 to 40 µm is from 0.85 to 0.90"

The average degree of circularity, tap density and BET specific surface area of the composite graphite particle for nonaqueous secondary batteries of the present invention are important parameters indicative of the shape. In general, there is a tendency that a particle having a small average degree of circularity is also low in the tap density and a particle having a low tap density is large in the specific surface area. When the average degree of circularity is small and the tap density is low, the void size ensured in the polar plate becomes small and at the same time, the solid content concentration of the negative electrode material slurry coated on a copper foil when producing the negative electrode is reduced. This is highly likely to incur worsening of the negative electrode performance and impairment of the battery performance. However, excessively large average degree of circularity and excessively high tap density also incur worsening of the coatability of the slurry and therefore, it is important that the composite graphite particle has an average degree of circularity and a tap density each in an appropriate range. Furthermore, the specific surface area is preferably small, because a large specific surface area gives rise to an increase in the initial irreversible capacity at the charge/discharge time.

i) Average Degree of Circularity (I) Definition of Average Degree of Circularity The average degree of circularity is defined as the average of values of circularity degree according to the following formula, which are obtained by mixing 0.2 g of the measuring object (composite graphite particle) with 50 mL of a 0.2 vol % aqueous solution of polyoxyethylene (20) sorbitan monolaurate as a surfactant, irradiating an ultrasonic wave of 28 kHz thereon at a power output of 60 W for 1 minute by using a flow-type particle image analyzer "FPIA-2000 manufactured by Sysmex Industrial", assigning the detection range to 0.6 to 400 µm, and measuring particles having a particle diameter of 1.5 to 10 µm and particles having a particle diameter of 10 to 40 µm.

Degree of circularity=circumferential length of a circle having the same area as the particle projected area/circumferential length of the particle projected image.

(II) Range

In the requirement (c) of the present invention, the average degree of circularity in the particle diameter range of 1.5 to 10 µm is preferably 0.90 or more, more preferably 0.95 or more, and the upper limit is preferably 0.98 or less, more preferably 0.95 or less. Also, the average degree of circularity in the particle diameter range of 10 to 40 µm is preferably 0.85 or more, more preferably 0.90 or more, and the upper limit is preferably 0.98 or less, more preferably 0.95 or less. If the average degree of circularity is less than this range, the gap between particles may become small to decrease the load characteristics, whereas if the average degree of circularity exceeds the range above, this requires strong or long-term implementation of a spheroidization treatment of repeatedly applying a mechanical action, mainly an impact force, including interaction of particles, such as compression, friction and shear force, to the particle, as a result, a large amount of by-product fine powder produced at the spheroidization must be removed, and the production cost may rise.

ii) Tap Density (I) Definition of Tap Density

In the present invention, the tap density is defined as the density determined from the volume when tapping is performed 500 times by using, for example, a powder density measuring apparatus, "Powder Tester Model PT-N", manufactured by Hosokawamicron Corp. and setting the stroke length to 18 mm, and the mass of the sample.

(II) Range

The tap density of the composite graphite particle of the present invention is preferably 0.80 g/cm$^3$ or more, more preferably 0.90 g/cm$^3$ or more, still more preferably 0.95 g/cm$^3$ or more, and is preferably 1.40 g/cm$^3$ or less, more preferably 1.25 g/cm$^3$ or less.

If the tap density is too low, the solid content concentration of the negative electrode material slurry coated on a current collector at the production of a negative electrode needs to be decreased, and the density of the coating becomes low, as a result, the composite graphite particle when pressed is readily broken and a battery performance may decrease. On the other hand, if the tap density is excessively high, the coatability is worsened, and a further step for adjusting the shape and particle size distribution of the composite graphite particle may be required, giving rise to a decrease in the yield and a rise of the cost.

iii) BET Specific Surface Area (I) Definition of BET Specific Surface Area

In the present invention, the BET specific surface area is measured and defined by the following method. The specific surface area is measured by a BET 6-point method according to a nitrogen gas adsorption-flow method using a specific surface area measuring apparatus, "Gemini 2360", manufactured by Shimadzu Corporation. Specifically, 1.01 g of a sample (composite graphite particle) is filled in a cell, pretreated by heating at 350° C., cooled to a liquid nitrogen temperature to cause saturated adsorption of a gas composed of 30% of nitrogen and 70% of helium, and then heated to room temperature, and from the results obtained by measuring the amount of gas desorbed, the specific surface area can be calculated by a normal BET method.

(II) Range

The specific surface area of the composite graphite particle of the present invention is preferably 1.6 m$^2$/g or more, more preferably 2.3 m$^2$/g or more, and is preferably 5.0 m$^2$/g or less, more preferably 4.7 m$^2$/g or less.

If the specific surface area is excessively high, this may incur an increase in the initial irreversible capacity at the charge/discharge time, whereas if the specific surface area is too low, sufficiently high charge load characteristics may not be obtained.

Requirement (1-d)

"Assuming that the value of the entire pore volume obtained by Hg porosimetry measurement of the spherical graphite particle (A) is p and the value of the entire pore volume obtained by Hg porosimetry measurement of the composite graphite particle (B) is q, the ratio r therebetween is defined by the following formula and is from 0.5 to 1.0:

$$r=p/q"$$

(I) Measuring Method and Definition of Pore Volume of Composite Graphite Particle by Mercury Porosimeter The mercury pore volume of the composite graphite particle of the present invention is defined by the mercury intrusion volume measured using a pore volume measuring apparatus "Autopore IV9520, manufactured by Micromeritics Corp." where a sample is encapsulated in the attached cell and pretreated under reduced pressure (50 µm Hg) at room temperature for 10 minutes and mercury is stepwise pressurized from 4.0 psia (pounds per square inch absolute) to 40,000 psia and then depressurized stepwise to 3.0 psia. More specifically, from the pressure P applied to the mercury, a pore diameter D is calculated using the Washburn equation ($D=-(1/P)4\gamma \cos \psi$), and the pore volume is defined by the obtained mercury intrusion/withdrawal curve. In the equation, $\gamma$ represents the surface tension of mercury and $\psi$ represents the contact angle.

(II) Range

The ratio r between the entire pore volume value of the spherical graphite particle and the entire pore volume value of the composite graphite particle, determined by the method above, is preferably 0.5 or more, more preferably 0.6 or more, still more preferably 0.65 or more, and is preferably 1.0 or less, more preferably 0.9 or less, still more preferably 0.8 or less.

If the total pore volume ratio is too small, a narrow gap between particles and bad diffusion of the electrolytic solution may result, giving rise to cycle deterioration or lithium precipitation, whereas if the total pore volume ratio is too large, Li ion intrudes into a micropore at the charge time but the Li ion may not exit the micropore at the discharge time to cause an increase in the irreversible capacity.

Requirement (2):

In the present invention, a preferred embodiment is the composite graphite particle for nonaqueous secondary batteries, wherein when a binder is added to the composite graphite particle and the mixture is coated on a metal current collector, dried and pressed to set an electrode density to 1.63 g/cm³ or more, the value p'/q' obtained by dividing the value p' of BET-specific surface area of the polar plate after pressing by the value q' of BET-specific surface area of the polar plate before pressing is from 1.5 to 2.5.

(i) Ratio of BET-Specific Surface Area of Polar Plate Between Before and After Pressing With respect to a predetermined limited polar plate produced by the following polar plate production method A using the composite graphite particle of the present invention, the ratio of BET-specific surface area of the active material on the polar plate between before and after pressing, measured by the following measuring method is preferably 1.5 or more, more preferably 1.6 or more, still more preferably 1.7 or more, and is preferably 2.5 or less, more preferably 2.4 or less, still more preferably 2.3 or less. If the ratio of BET-specific surface area of the polar plate between before and after pressing is lower than the lower limit, bad diffusion of the electrolytic solution may result, giving rise to cycle deterioration or lithium precipitation, whereas if the ratio exceeds the upper limit, this may incur an increase in the initial charge/discharge irreversible capacity.

I) Production Method A of Polar Plate

2 Parts by weight as a solid content of an aqueous dispersion of styrene butadiene rubber and 1 part by weight as a solid content of an aqueous carboxymethyl cellulose (weight average molecular weight: from 250,000 to 300,000) solution are added to 100 parts by weight of the composite graphite particle to form a slurry, and this slurry is coated by a doctor blade on a current collector composed of a 18 µm-thick copper foil to adhere in an amount of 10±0.1 mg/cm² in terms of the dry weight, dried and then consolidated by pressing once while adjusting the press load to form an active material layer having a density of 1.63±0.03 g/cm³.

II) Measuring Method of BET-Specific Surface Area of Active Material on Polar Plate The specific surface area is measured by a BET 6-point method according to a nitrogen gas adsorption-flow method using a specific surface area measuring apparatus, "Gemini 2360", manufactured by Shimadzu Corporation. Specifically, a polar plate before or after pressing is cut out with a weight of 1.01 g in terms of a mixture weight of composite graphite particle, styrene butadiene rubber and carboxymethyl cellulose on the polar plate, filled in a cell, pretreated by heating at 110° C., cooled to a liquid nitrogen temperature to cause saturated adsorption of a gas composed of 30% of nitrogen and 70% of helium, and then heated to room temperature, and from the results obtained by measuring the amount of gas desorbed, the specific surface area is calculated by a normal BET method.

[2] Negative Electrode Material for Nonaqueous Secondary Batteries

The composite graphite particle for nonaqueous secondary batteries of the present invention (hereinafter, the "composite graphite particle (B)") can be used by itself as a negative electrode material for nonaqueous secondary batteries, but it is also preferred to further incorporate one or more kinds of carbonaceous particles (hereinafter simply referred to as a "carbonaceous particle (C)") selected from the group consisting of natural graphite, artificial graphite, vapor phase grown carbon fiber, electrically conductive carbon black, amorphous coated graphite, resin coated graphite and amorphous carbon and use the mixture as a negative electrode material for nonaqueous secondary batteries.

By appropriately selecting and mixing the carbonaceous particle (C), an electrical conductivity can be enhanced and this enables enhancing the cycle characteristic, enhancing the charge acceptance, reducing the irreversible capacity and enhancing the press property. In the case of mixing the carbonaceous particle (C), when blending a carbonaceous particle of 5 µm or less, the lower limit of the amount thereof is 0.1 mass % or more, preferably 0.5 mass % or more, more preferably 0.6 mass % or more, and when blending a carbonaceous particle of 5 µm or more, the lower limit is 5 wt % or more, preferably 10 mass % or more, more preferably 20 wt % or more, still more preferably 40 wt % or more. For both particles, the upper limit is usually 95 mass % or less, preferably 80 mass % or less, more preferably 50 mass % or less, still more preferably 40 mass % or less. If the amount is less than this range, the effect of enhancing the electrical conductivity may be difficult to obtain, whereas if it exceeds the range above, the characteristics of the composite graphite particle (B) may be hardly obtained and an increase in the initial irreversible capacity may be incurred.

Among the carbonaceous particles (C), as to the natural graphite, for example, highly purified flake graphite or spheroidized graphite may be used. The volume-based average particle diameter of the natural graphite is usually 8 μm or more, preferably 10 μm or more, and is usually 60 μm or less, preferably 40 μm or less. The BET specific surface area of the natural graphite is usually 4 m$^2$/g or more, preferably 4.5 m$^2$/g or more, and is usually 9 m$^2$/g or less, preferably 5.5 m$^2$/g or less.

As to the artificial graphite, for example, a particle obtained by forming a composite of coke powder or natural graphite, and a binder, or a particle obtained by calcining and graphitizing a single graphite precursor particle in a powder state may be used.

As to the amorphous coated graphite, for example, a particle obtained by coating natural graphite or artificial graphite with an amorphous precursor and calcining the coated graphite, or a particle obtained by coating natural graphite or artificial graphite with an amorphous material may be used.

As to the resin coated graphite, for example, a particle obtained by coating natural graphite or artificial graphite with a polymer material and drying the coated graphite may be used. As to the amorphous carbon, for example, a particle obtained by calcining a bulk mesophase, or a particle obtained by subjecting a carbon precursor to infusible treatment and calcination may be used.

Among these, in the case of using the particle by blending it as the carbonaceous particle (C) to the composite graphite particle of the present invention, natural graphite is particularly preferred because a high capacity can be maintained.

The production method is described below. The composite graphite particle of the present invention is produced by mixing a carbonaceous particle as a raw material, a binder and the like and, if desired, subjecting the mixture to shaping, calcination for removing volatile components, graphitization, pulverization and classification. In order to produce the composite graphite particle of the present invention satisfying the above-described physical properties, it is important to combine the following measures.

In the present invention, a spherical graphite particle is preferably selected as a raw material.

Also, the kind or amount of a pitch or the like as the binder may be optimized when kneading together a spherical graphite particle and a binder, or the strength at the pulverization may be optimized.

A preferred production method of the composite graphite particle or the like of the present invention is described in detail below.

First, a spherical graphite particle and a binder are kneaded together while heating. At this time, if desired, a graphitization catalyst may be added. The preferred spherical graphite particle (carbonaceous particle) and binder are as described above, and the preferred graphitization catalyst is as follows.

The binder is used in such an amount that the ratio of the binder-derived portion occupying in the composite graphite particle obtained by carbonization/graphitization and passed through a graphitization treatment becomes usually 1 wt % or more, preferably 5 mass % or more, more preferably 10 mass % or more. The upper limit is such an amount that this ratio becomes usually 65 mass % or less, preferably 60 mass % or less, more preferably 50 mass % or less. If the binder amount is excessively large, the binder-derived amorphous portion accounts for a large proportion in the final product and therefore, the battery capacity of a battery produced may decrease. Furthermore, the obtained composite graphite particle becomes hard and when the active material layer coated on a current collector is pressed, not the binder-derived portion but the carbonaceous particle-derived graphite particle itself is readily collapsed. On the other hand, if the binder amount is too small, the composite graphite particle becomes excessively soft and good charge/discharge load characteristics are not obtained.

The binder amount in the composite graphite particle is controlled by the amount of the binder added at a stage before kneading. For example, in the case where the actual carbon ratio in the binder determined by the method described in JIS K2270 is p %, a binder of 100/p times the desired amount is added.

Incidentally, at the addition of the binder such as pitch and tar, the binder is preferably uniformly dispersed as at a low temperature in a short time as possible so as to decrease the initial irreversible capacity and reduce the press load. For performing the dispersion at a low temperature in a short time, this may be attained by intensifying the stirring to an extent of not collapsing the carbonaceous particle.

(iii) Graphitization Catalyst

In order to increase the charge/discharge capacity and improve the press property, a graphitization catalyst may be added when mixing the carbonaceous particle and the binder. Examples of the graphitization catalyst include a metal such as iron, nickel, titanium, silicon and boron, and a compound such as carbide, oxide and nitride of the metal. Among these, silicon, a silicon compound, iron and an iron compound are preferred. Among silicon compounds, silicon carbide is preferred, and among iron compounds, iron oxide is preferred.

In the case of using silicon or a silicon compound as the graphitization catalyst, silicon carbide produced by heating is all thermally decomposed at a temperature of 2,800° C. or more, and this allows the growth of graphite with very good crystallinity and the formation of a pore between graphite crystals when silicon is volatilized, so that a charge transfer reaction and diffusion of lithium ion inside the particle can be promoted and the battery performance can be enhanced. Also, in the case of using iron or a compound thereof as the graphitization catalyst, graphite with good crystallinity can be grown by mechanisms of dissolution and precipitation of carbon in the catalyst and the same effect as that of silicon can be brought out.

The amount of the graphitization catalyst added is usually 30 mass % or less, preferably 20 mass % or less, more preferably 10 mass % or less, still more preferably 5 mass % or less, based on the carbonaceous primary particle as a raw material. If the amount of the graphitization catalyst is too large, graphitization excessively proceeds and there may arise a problem that the characteristics at the production of a lithium ion secondary battery, particularly the immersion property, become insufficient. At the same time, maybe the strength of the particle is decreased because a pore is produced in the composite graphite particle, as a result, the surface is smoothed in the pressing step at the production of a polar plate and movement of ion is sometimes inhibited.

On the other hand, if the amount of the graphitization catalyst is too small, graphitization proceeds insufficiently to cause a problem of reduction in the charge/discharge capacity of a nonaqueous secondary battery produced, or a high pressure is required in the pressing step at the production of a polar plate, making it difficult to realize a high density. Furthermore, maybe the strength of the particle becomes too high because an appropriate number of pores are not present in the composite graphite particle, and a high pressure is required when the active material layer coated on a current collector is press-formed to a predetermined bulk density, making it difficult to form a high-density negative electrode active material layer.

(iv) Kneading (Mixing)]

The raw materials such as carbonaceous particle, binder and graphitization catalyst added, if desired, are first kneaded under heating, whereby a state of the binder in a liquid form being attached to the carbonaceous particle and the raw material incapable of melting at the kneading temperature is created. In this case, all raw materials may be charged into the kneader, and the temperature may be raised simultaneously with kneading. Alternatively, components other than the binder may be charged into the kneader and heated with stirring and after the temperature is raised to the kneading temperature, the binder at an ordinary temperature or in a vulcanized and melted state may be charged.

The heating temperature is more than the softening point of the binder. If the heating temperature is too low, the binder is increased in the viscosity and its mixing becomes difficult. Therefore, the heating is performed usually at a temperature 10° C. or more higher than the softening point, preferably at a temperature 20° C. or more higher than the softening point. If the heating temperature is too high, the viscosity of the mixing system is excessively increased due to volatilization and polycondensation of the binder, and for this reason, the heating temperature is usually 300° C. or less, preferably 250° C. or less.

The kneader is preferably a machine having a stirring blade, and a general-purpose stirring blade such as Z type and masticator type may be used. The amount of the raw material charged into the kneader is usually 10 vol % or more, preferably 15 vol % or more, and is 50 vol % or less, preferably 30 vol % or less, based on the volume of the mixer. The kneading time needs to be 5 minutes or more and be at longest a time until the viscous property greatly changes due to volatilization of the volatile content, and is usually from 30 to 120 minutes. The kneader is preferably preheated to the kneading temperature in advance of kneading.

(v) Shaping

The thus-obtained kneaded material may be directly subjected to a de-VM calcination step having a purpose of removing and carbonizing volatile components (hereinafter simply referred to as "VM") but is preferably subjected to the de-VM calcination step after shaping so as to facilitate the handling.

The shaping method is not particularly limited as long as the shape can be maintained, and extrusion molding, die molding, isostatic molding and the like may be employed. Among these, die molding requiring a relatively easy operation and making it possible to obtain a shaped product without collapsing a randomly oriented structure resulting from kneading is more preferred than extrusion molding readily allowing for orientation of particles in the shaped product or isostatic molding having a problem in the productivity, despite maintaining a random orientation of particles.

As for the shaping temperature, the shaping may be performed either at room temperature (cold) or under heating (hot, a temperature not lower than the softening point of the binder). In the case of cold shaping, in order to enhance the shapability and obtain uniformity of the shaped product, a mixture cooled after kneading is preferably coarsely pulverized to a maximum dimension of 1 mm or less. The shape and size of the shaped product are not particularly limited, but in hot shaping, if the shaped product is too large, uniform preheating performed in advance of shaping disadvantageously takes much time. Therefore, the shaped product preferably has a size of usually about 150 cm or less in terms of the maximum dimension.

As for the shaping pressure, if the pressure is too high, removal of volatile components (de-VM) through a pore of the shaped product becomes difficult and carbonaceous particles not in a perfect circular form may be oriented to make the pulverization in a later step difficult. Therefore, the upper limit of the shaping pressure is usually 3 tf/cm$^2$ (294 MPa) or less, preferably 500 kgf/cm$^2$ (49 MPa) or less, more preferably 10 kgf/cm$^2$ (0.98 MPa) or less. The lower limit of the pressure is not particularly limited but is preferably set to such an extent that the shape of the shaped product can be maintained in the de-VM step.

(vi) De-VM Calcination

The shaped product obtained is subjected to de-VM calcination so as to remove volatile components (VM) of the carbonaceous particle and binder and thereby prevent contamination with a packing material at the graphitization or fixation of a packing material to the shaped product. The de-VM calcination is performed at a temperature of usually 600° C. or more, preferably 650° C. or more, and usually 1,300° C. or less, preferably 1,100° C. or less, for usually from 0.1 to 10 hours. The heating is usually performed under flow of an inert gas such as nitrogen and argon or in a non-oxidative atmosphere created by filling a gap with a granular carbon material such as breeze and packing coke.

The equipment used for the de-VM calcination is not particularly limited as long as the calcination can be performed in a non-oxidative atmosphere, and it may be, for example, an electric furnace, a gas furnace or a Riedhammer furnace for electrode material. The temperature rise rate at the heating is preferably low for removing the volatile content, and the temperature is usually raised at 3 to 100° C./hr from the vicinity of 200° C. at which the low boiling point content starts volatilizing, to the vicinity of 700° C. at which only hydrogen is generated.

(vii) Graphitization

The carbide shaped product obtained by the de-VM calcination is subsequently heated at a high temperature and thereby graphitized. The hating temperature at the graphitization is usually 2,600° C. or more, preferably 2,800° C. or more. If the heating temperature is excessively high, sublimation of graphite becomes prominent. Therefore, the heating temperature is preferably 3,300° C. or less. The heating time may be sufficient if it is long enough to allow the binder and carbonaceous particle to become graphite, and the heating time is usually from 1 to 24 hours.

As for the atmosphere at the graphitization, in order to prevent oxidation, the graphitization is performed under flow of an inert gas such as nitrogen and argon or in a non-oxidative atmosphere created by filling a gap with a granular carbon material such as breeze and packing coke. The equipment used for graphitization is not particularly limited as long as the above-described purpose can be satisfied, and it may be, for example, an electric furnace, a gas furnace or an Acheson furnace for electrode material. The temperature rise rate, cooling rate, heat treatment time and the like can be arbitrarily set within the allowable range of the equipment used.

(viii) Pulverization

The thus-obtained graphitization product is usually incapable of satisfying the requirements of the present invention as it is and therefore, is subjected to pulverization or grinding. The steps therefor are roughly classified into three steps of coarse pulverization, medium pulverization and fine pulverization.

The pulverizing/grinding method of the graphitization product is not particularly limited, but examples of the device for pulverization/grinding include a mechanical grinding device such as ball mill, hammer mill, CF mill, atomizer mill and pulverizer, and a pulverizing device utilizing a wind force, such as jet mill. As for coarse pulverization and medium pulverization, a pulverizing system by an impact force, such as jaw crusher, hammer mill and roller mill, may be used. Here, the timing of pulverization may be before graphitization or after graphitization. The latter is preferred because an operation such as crucible-filling is not necessary and the composite graphite particle can be produced at a low cost.

(viii)-1 Coarse Pulverization and Medium Pulverization

In order to satisfy the requirements of the present invention, in the coarse pulverization/medium pulverization of the graphitization product, for example, when using "Pulverizer Model VM-32, manufactured by Orient Kogyo", the graphitization product is conveyed to the pulverizer by a belt conveyor-type feeder and pulverized by rotating a pulverization blade at a speed of 1,000 revolutions/min or more. If excessive pulverization/grinding is performed at this pulverization stage, a large amount of fine powder is generated on the particle surface of the graphitization product and when a battery is fabricated using an electrode coated with the pulverization product, the irreversible capacity at the initial charge/discharge time is likely to increase due to the fine powder.

(viii)-2 Fine Pulverization

In the fine pulverization of the graphitized particle, when using, for example, "Pulverizer Model TB-250, manufactured by Turbo Kogyo Co., Ltd.", the graphitization product is conveyed into the pulverizer at a rate of 50 kg/min, 55 kg/min or 60 kg/min with a constant-delivery spiral feeder and pulverized. If the rate of conveying the pulverization product into the pulverizer is decreased, when the rotation speed of the pulverization blade is kept constant, excessive pulverization may result to reduce the orientation ratio specified in (1-c) of claim calculated from XRD measurement of the graphitization product.

For satisfying the requirements specified in the invention, in the case of using, for example, "Pulverizer Model TB-250, manufactured by Turbo Kogyo Co., Ltd.", the rotation speed of the pulverization blade at the fine pulverization is preferably 2,000 revolutions/min or more, more preferably 2,500 revolutions/min or more, still more preferably 3,000 revolutions/min or more, and is preferably 7,800 revolutions/min or less, more preferably 6,500 revolutions/min or less, still more preferably 4,500 revolutions/min or less. If the rotation speed of the pulverization blade is too low, granulation excessively proceeds and the pressing load when highly densifying the electrode is increased, readily allowing occurrence of spring back, as a result, a high density state of the electrode may not be maintained. Also, if the rotation speed of the pulverization blade is too high, the orientation ratio specified in (1-c) of claim calculated from XRD measurement of the graphitization product may be decreased and the repetition of charge/discharge is likely to cause serious cycle deterioration.

(ix) Classification

From the pulverization or grinding product obtained, a large-diameter granular material/a small-diameter granular material (fine powder) may be removed, if desired.

Removal of a large-diameter granular material may bring reduction in the generation of short-circuiting or unevenness at the coating, and removal of a small-diameter granular material (fine powder) may bring reduction in the initial irreversible capacity. It is also preferred to regulate the particle size by the removal of large-diameter granular material and fine powder such that in the volume-based particle diameter distribution obtained by laser diffraction/scattering particle diameter measurement, those having a particle diameter of 100 μm or more account for 3% or less in the entirety and those having a particle diameter of 1 μm or less account for 1% or less in the entirety.

Various methods are known for removing a large-diameter granular material/a small-diameter granular material, but removal by sieving and classification is preferred in view of simplicity, operability and cost of the apparatus. Furthermore, sieving or classification is advantageous in that the particle size distribution and average particle diameter of the composite graphite particle can be reregulated, if desired, when change is caused therein due to graphitization and removal of those granular materials.

Examples of the sieving for removing a large-diameter granular material include a mesh fixing system, an in-plane motion system and a rotary sieving system, but in view of processing ability, a blow through-type sieve out of mesh fixing systems is preferred. For example, a sieve having an opening size of 30 to 80 μm is used. An appropriate sieve is selected and used according to the production conditions (particularly, the amount and particle diameter) of the granular material to be removed and the required adjustment of the particle size distribution and average particle diameter of the composite graphite particle.

The classification may be performed by air classification, wet classification, gravity classification or the like and although the method for removing a granular material of 100 μm or more is not particularly limited, considering the effect on the property of the composite graphite particle as well as the adjustment of the particle size distribution and average particle size of the composite particle graphite, use of an air classifier such as rotational flow classifier is preferred. In this case, similarly to adjusting the opening size of the sieve above, by controlling the air volume and wind velocity, those granular materials can be removed and the particle size distribution and average particle diameter of the composite graphite particle can be adjusted.

[4] Negative Electrode for Nonaqueous Secondary Batteries

The composite graphite particle of the present invention can be suitably used as a negative electrode material of a nonaqueous secondary battery, particularly, a lithium ion secondary battery. Also, as described above, the blend of the composite graphite particle (B) of the present invention and the carbonaceous particle (C) can be suitably used as the negative electrode material.

The apparatus used for mixing the composite graphite particle (B) and the carbonaceous particle (C) is not particularly limited, but examples of the rotary mixer include a cylindrical mixer, a twin cylindrical mixer, a double conical mixer, a regular cubic mixer and a spade mixer, and examples of the fixed mixer include a helical mixer, a ribbon mixer, a Muller-type mixer, a Helical Flight-type mixer, a Pugmill-type mixer and a fluidized mixer.

The negative electrode constituting the nonaqueous secondary battery is produced by forming an active material layer containing a negative electrode material, a polar plate-forming binder, a thickener and an electrically conductive material on a current collector. The active material layer is usually obtained by preparing a slurry containing a negative electrode material, a polar plate-forming binder, a thickener, an electrically conductive material and a solvent, coating the slurry on a current collector, and drying and pressing the coating.

As for the polar plate-forming binder, an arbitrary binder may be used as long as it is a material stable to the solvent or electrolytic solution used at the production of an electrode. Examples thereof include polyvinylidene fluoride, polytetrafluoroethylene, polyethylene, polypropylene, styrene butadiene rubber, isoprene rubber, butadiene rubber, an ethylene-acrylic acid copolymer and an ethylene-methacrylic acid copolymer. The polar plate-forming binder is used in a weight ratio of negative electrode material/polar plate-forming binder of usually 90/10 or more, preferably 95/5 or more, and usually 99.9/0.1 or less, preferably 99.5/0.5 or less.

Examples of the thickener include carboxymethyl cellulose, methyl cellulose, hydroxymethyl cellulose, ethyl cellulose, polyvinyl alcohol, starch oxide, starch phosphate and casein.

Examples of the electrically conductive material include a metal material such as copper and nickel, and a carbon material such as graphite and carbon black.

Examples of the material for the current collector include copper, nickel and stainless steel. Among these, a copper foil is preferred in view of its easy formability into a thin film and the cost.

The density of the active material layer varies depending on the usage, but in the application giving priority to the capacity, the density is usually 1.55 g/cm$^3$ or more, preferably 1.60 g/cm$^3$ or more, more preferably 1.65 g/cm$^3$ or more, still more preferably 1.70 g/cm$^3$ or more. If the density is too low, the capacity of the battery per unit volume may not be necessarily sufficient. Also, if the density is excessively high, the charge/discharge high-load characteristics decrease, and therefore, the density is preferably 1.90 g/cm$^3$ or less. The "active material layer" as used herein indicates a mixture layer composed of an active material, a polar plate-forming binder, a thickener, an electrically conductive material and the like, on a current collector, and the density thereof indicates the bulk density of the active material layer at the time of assembling it into a battery.

[5] Nonaqueous Secondary Battery

The negative electrode for nonaqueous secondary batteries, produced using the composite graphite particle of the present invention or the negative electrode material of the present invention, is very useful particularly as a negative electrode of a nonaqueous secondary battery such as lithium secondary battery.

The selection of members necessary in the battery configuration, such as positive electrode and electrolytic solution constituting the nonaqueous secondary battery, is not particularly limited. In the following, examples of the material and the like for a member constituting the nonaqueous secondary battery are described, but the material which can be used is not limited to these specific examples.

The nonaqueous secondary battery of the present invention usually comprises at least the above-described negative electrode of the present invention, a positive electrode and an electrolyte.

The positive electrode is produced by forming an active material layer containing a positive electrode active material, an electrically conductive material and a polar plate-forming binder, on a positive electrode current collector. The active material layer is usually obtained by preparing a slurry containing a positive electrode active material, an electrically conductive material and a polar plate-forming binder, coating the slurry on a current collector, and drying the coating.

As for the positive electrode active material, there may be used a material capable of storing and releasing lithium, for example, a lithium-transition metal composite oxide material such as lithium cobalt oxide, lithium nickel oxide and lithium manganese oxide; a transition metal oxide material such as manganese dioxide; or a carbonaceous material such as graphite fluoride. Specific examples of the material which can be used include LiFePO$_4$, LiFeO$_2$, LiCoO$_2$, LiNiO$_2$, LiMn$_2$O$_4$, their nonstoichiometric compounds, MnO$_2$, TiS$_2$, FeS$_2$, Nb$_3$S$_4$, M$_{O3}$S$_4$, CoS$_2$, V$_2$O$_5$, P$_2$O$_5$, CrO$_3$, V$_3$O$_3$, TeO$_2$ and GeO$_2$.

As for the positive electrode current collector, a metal capable of forming a passivation film on the surface through anodic oxidation in an electrolytic solution, or an alloy thereof is preferably used, and examples thereof include metals belonging to Groups IIIa, IVa and Va (Groups 3B, 4B and 5B), and alloys thereof. Specific examples thereof include Al, Ti, Zr, Hf, Nb, Ta and an alloy containing such a metal, and Al, Ti, Ta and an alloy containing such a metal can be preferably used. In particular, Al and an alloy thereof are preferred, because these are lightweight and therefore, assured of a high energy density.

Examples the electrolyte include an electrolytic solution, a solid electrolyte and a gelled electrolyte. Among these, an electrolytic solution, particularly, a nonaqueous electrolytic solution, is preferred. As for the nonaqueous electrolytic solution, those obtained by dissolving a solute in a nonaqueous solvent may be used.

Examples of the solute which can be used include an alkali metal salt and a quaternary ammonium salt. Specifically, for example, one or more compounds selected from the group consisting of LiClO$_4$, LiPF$_6$, LiBF$_4$, LiCF$_3$SO$_3$, LiN(CF$_3$SO$_2$)$_2$, LiN(CF$_3$CF$_2$SO$_2$)$_2$, LiN(CF$_3$SO$_2$)(C$_4$F$_9$SO$_2$) and LiC(CF$_3$SO$_2$)$_3$ are preferably used.

Examples the nonaqueous solvent include a cyclic carbonate such as ethylene carbonate and butylene carbonate; a cyclic ester compound such as γ-butyrolactone; a chain ether such as 1,2-dimethoxyethane; a cyclic ether such as crown ether, 2-methyltetrahydrofuran, 1,2-dimethyltetrahydrofuran, 1,3-dioxolane and tetrahydrofuran; and a chain carbonate such as diethyl carbonate, ethyl methyl carbonate and dimethyl carbonate. For each of the solute and the solvent, one kind may be selected and used, or two or more kinds may be mixed and used. Among these, a nonaqueous solvent containing a cyclic carbonate and a chain carbonate is preferred. Also, a compound such as vinylene carbonate, vinylethylene carbonate, succinic anhydride, maleic anhydride, propanesultone and diethylsulfone may be added thereto.

The content of the solute in the electrolytic solution is preferably 0.2 mol/L or more, more preferably 0.5 mol/L or more, and is preferably 2 mol/L or less, more preferably 1.5 mol/L or less.

Above all, a nonaqueous secondary battery produced by combining the negative electrode of the present invention with a metal chalcogenide-based positive electrode and an organic electrolytic solution mainly composed of a carbonate-based solvent ensures that the capacity is large, the irreversible capacity observed in the initial cycle is small, the quick charge/discharge capacity is high (good rate characteristics), the cycle characteristics are excellent, the storability and reliability of the battery when left standing under a high temperature are high, highly efficient discharge characteristics are realized, and the discharge characteristics at a low temperature are very excellent.

For preventing a positive electrode from coming into physical contact with a negative electrode, a separator is usually provided between the positive electrode and the negative electrode. The separator preferably has high ion permeability and low electric resistance. The material and shape of the separator are not particularly limited, but those stable against the electrolytic solution and excellent in the liquid storability are preferred. Specific examples thereof include a porous sheet and a nonwoven fabric, whose raw material is a polyolefin such as polyethylene and polypropylene.

The shape of the nonaqueous secondary battery of the present invention is not particularly limited, and examples thereof include a cylinder type obtained by spirally forming a sheet electrode and a separator, a cylinder type of inside-out structure obtained by combining a pellet electrode and a separator, and a coin type obtained by laminating a pellet electrode and a separator.

EXAMPLES

Specific embodiments of the present invention are described in greater detail below by referring to Examples, but the present invention is not limited to these Examples.

Example 1

A graphite particle having an average particle diameter of 100 μm was subjected to a spheroidization treatment by using Hybridization System Model NHS-3 manufactured by Nara Machinery Co., Ltd. at a rotor peripheral speed of 60 m/sec for 4 minutes to obtain a spherical graphite particle having a cumulative 50% diameter of 10.6 μm, a cumulative 10% diameter of 6.7 μm, a cumulative 90% diameter of 16.0 μm, and a Tap density of 0.77 g/cm$^3$. This spherical graphite particle was observed for its shape by an electron microscope and found to be composed of a plurality of flake or vein graphites that are curved or bent.

This spherical graphite particle and a binder pitch having a softening point of 88° C. as a graphitizable binder were mixed in a weight ratio of 100:40, and the mixture was charged into a kneader having a masticator-type stirring blade and being previously heated at 128° C., and kneaded for 20 minutes.

The thoroughly kneaded mixture was filled in a mold of a mold-pressing machine previously preheated to 108° C. and was left standing for 5 minutes and when the mixture temperature was stabilized, the mixture was shaped by pressing a plunger to apply a pressure of 2 kgf/cm$^3$ (0.20 MPa). After keeping this pressure for 1 minute, the driving was stopped and when the pressure drop was settled, the shaped product was taken out.

The shaped product obtained was housed in a metal-made saggar as a heat-resistant container and after filling a graphite breeze in the gap, de-VM calcination was performed in an electric furnace by elevating the temperature from room temperature to 1,000° C. over 48 hours and then keeping it at 1,000° C. for 3 hours. Subsequently, the shaped product was housed in a graphite crucible and after filling a graphite breeze in the gap, graphitization was performed in an Acheson furnace under heating at 3,000° C. for 4 hours.

The graphite shaped product obtained was coarsely pulverized by a jaw crusher and then finely pulverized in a mill in which the rotation speed of the pulverizing blade was set to 6,500 revolutions/min, and a coarse particle was removed through a 45-μm sieve to obtain a composite graphite particle. With respect to this composite graphite particle, the "BET specific surface area", "tap density", "average degree of circularity", "cumulative 50% diameter ratio", "cumulative 90% diameter ratio", "cumulative 10% diameter ratio", "orientation ratio of composite graphite particle/orientation ratio of spherical graphite particle" by powder XRD measurement, "entire pore volume of composite graphite particle/entire pore volume of spherical graphite particle" by Hg porosimetry measurement, and "BET-specific surface area of polar plate after pressing/BET-specific surface area of polar plate before pressing", that is, BET-specific surface area ratio of polar plate between before and after pressing, are shown in Table 1.

(i) Production Method of Polar Plate (Negative Electrode Sheet)

Using this composite graphite particle as the negative electrode material, a polar plate having an active material layer with an active material layer density of 1.70 g/cm$^3$ was produced by the method described above. That is, specifically, 20.00±0.02 g of the negative electrode material above, 20.00±0.02 g of an aqueous 1 mass % carboxymethyl cellulose (CMC) solution, and 0.25±0.02 g of an aqueous dispersion of styrene butadiene rubber (SBR) having a weight average molecular weight of 270,000 were stirred in a hybrid mixer manufactured by Keyence Corp. for 5 minutes to obtain a slurry. This slurry was coated in a width of 5 cm on a 18 μm-thick copper foil as a current collector by a doctor blade method to give a negative electrode material coverage of 11.0±0.1 mg/cm$^2$ and then air-dried at room temperature. After further drying at 110° C. for 30 minutes, the density of the active material layer was adjusted to 1.70 g/cm$^3$ by roll-pressing with a roller of 20 cm in diameter, whereby a negative electrode sheet was obtained.

(ii) Production Method of Nonaqueous Secondary Battery

The negative electrode sheet produced by the method above was punched out into a plate of 4 cm×3 cm and used as the negative electrode, and a positive electrode composed of LiCoO$_2$ was punched out into the same area and combined. A separator (made of a porous polyethylene film) impregnated with an electrolytic solution obtained by dissolving LiPF$_6$ in a mixed solvent of ethylene carbonate, ethyl methyl carbonate and dimethyl carbonate (volume ratio=25:37.5:37.5) to give a concentration of 1 mol/L and further adding 2 vol % of vinylene carbonate as an additive was placed between the negative electrode and the positive electrode to produce a laminate-type battery.

Using the nonaqueous secondary battery produced above, the initial charge/discharge irreversible capacity and the charge acceptance were measured by the following methods. The results are shown in Table 2.

(iii) Measurements of Charge/Discharge Irreversible Capacity in Initial Cycle and Charge Acceptance The negative electrode sheet produced in Example 1 was punched into 12.5ϕ and used as the negative electrode, a 0.5 mm-thick metal Li foil punched out into the same size and pressure-bonded to a stainless steel plate was used as the positive electrode, and a bipolar cell was fabricated. Fabrication of the cell was performed in a dry box adjusted to a water content of 20 ppm or less, and a separator (made of a porous polyethylene film) impregnated with an electrolytic solution obtained by dissolving LiPF$_6$ in a mixed solvent of ethylene carbonate, ethyl methyl carbonate, and dimethyl carbonate (volume ratio=25:30:30) to give a concentration of 1 mol/L was placed between the negative electrode and the positive electrode. Using this cell, a charge/discharge test was performed under the conditions of a discharge current of 0.05 C (0.2 mA/cm$^2$) or 0.2 C (0.8 mA/cm$^2$).

The results of the charge/discharge test performed by this method are shown in Table 2.

Thereafter, a polar prate was prepared by the following production method of an electrode, and a nonaqueous secondary battery was produced and measured for the "cycle characteristics". The measurement results of cycle characteristics are shown in Table 2.

(i) Production Method of Polar Plate (Negative Electrode Sheet) for Evaluation of Cycle Characteristics Using this composite graphite particle as the negative electrode material, a polar plate having an active material layer with an active material layer density of 1.80 g/cm$^3$ was produced by the method described above. That is, specifically, 20.00±0.02 g of the negative electrode material above, 20.00±0.02 g of an aqueous 1 mass % carboxymethyl cellulose (CMC) solution, and 0.25±0.02 g of an aqueous dispersion of styrene butadiene rubber (SBR) having a weight average molecular weight of 270,000 were stirred in a hybrid mixer manufactured by Keyence Corp. for 5 minutes to obtain a slurry. This slurry was coated in a width of 5 cm on a 18 μm-thick copper foil as a current collector by a doctor blade method to give a negative electrode material coverage of 11.0±0.1 mg/cm$^2$ and then air-dried at room temperature. After further drying at 110° C. for 30 minutes, the density of the active material layer was adjusted to 1.80 g/cm$^3$ by roll-pressing with a roller of 20 cm in diameter, whereby a negative electrode sheet was obtained.

(ii) Production Method of Nonaqueous Secondary Battery

A nonaqueous secondary battery was produced in the same manner as in the method above.

Example 2

A composite graphite particle was obtained in the same manner as in Example 1 except for using a binder pitch having a softening point of 88° C. as a graphitizable binder and setting the amount of the binder pitch to 30 parts by weight in Example 1 and measured for the above-described physical properties. Subsequently, a polar plate (negative electrode sheet) and a nonaqueous secondary battery were produced in the same manner as in Example 1 and measured for the "charge/discharge irreversible capacity in the initial cycle" and "charge acceptance", and the cycle characteristics were measured in the same manner as in Example 1. Physical properties of the composite graphite particle are shown in Table 1, and the measurement results of the charge/discharge irreversible capacity in the initial cycle, charge acceptance and cycle characteristics are shown in Table 2.

Example 3

A composite graphite particle was obtained in the same manner as in Example 1 except for using a binder pitch having a softening point of 88° C. as a graphitizable binder, setting the amount of the binder pitch to 50 parts by weight and setting the rotation speed of the pulverization blade to 3,000 revolutions/min in Example 1 and measured for the above-described physical properties. The results obtained are shown in Table 1.

Example 4

A composite graphite particle was obtained in the same manner as in Example 1 except for using a binder pitch having a softening point of 88° C. as a graphitizable binder, setting the amount of the binder pitch to 50 parts by weight and setting the rotation speed of the pulverization blade to 4,500 revolutions/min in Example 1 and measured for the above-described physical properties. The results obtained are shown in Table 1.

Example 5

A composite graphite particle was obtained in the same manner as in Example 1 except for using a binder pitch having a softening point of 88° C. as a graphitizable binder, setting the amount of the binder pitch to 50 parts by weight and setting the rotation speed of the pulverization blade to 6,500 revolutions/min in Example 1 and measured for the above-described physical properties. The results obtained are shown in Table 1.

Comparative Example 1

A graphite particle having an average particle diameter of 100 μm was subjected to a spheroidization treatment by using Hybridization System Model NHS-3 manufactured by Nara Machinery Co., Ltd. at a rotor peripheral speed of 60 m/sec for 8 minutes to obtain a spherical graphite particle having a cumulative 50% diameter of 17.4 μm, a cumulative 10% diameter of 11.9 μm, a cumulative 90% diameter of 26.4 μm, and a Tap density of 1.04 g/cm$^3$. A composite graphite particle was obtained in the same manner as in Example 1 except for using the spherical graphite particle obtained above, using a binder pitch having a softening point of 88° C. as a graphitizable binder, setting the amount of the binder pitch to 30 parts by weight and setting the rotation speed of the pulverization blade to 7,800 revolutions/min and measured for the above-described physical properties. Subsequently, a polar plate (negative electrode sheet) and a nonaqueous secondary battery were produced and measured for the "charge/discharge irreversible capacity in the initial cycle" and "charge acceptance" in the same manner as in Example 1, and the cycle characteristics were measured in the same manner as in Example 1. Physical properties of the composite graphite particle are shown in Table 1, and the measurement results of the charge/discharge irreversible capacity in the initial cycle, charge acceptance and cycle characteristics are shown in Table 2.

Comparative Example 2

A graphite particle having an average particle diameter of 100 μm was subjected to a spheroidization treatment by using Hybridization System Model NHS-3 manufactured by Nara Machinery Co., Ltd. at a rotor peripheral speed of 65 m/sec for 15 minutes to obtain a spherical graphite particle having a cumulative 50% diameter of 22.2 μm, a cumulative 10% diameter of 14.9 μm, a cumulative 90% diameter of 35.4 μm, and a Tap density of 1.02 g/cm$^3$. A composite graphite particle was obtained in the same manner as in Example 1 except for using the spherical graphite particle obtained above, using a binder pitch having a softening point of 88° C. as a graphitizable binder, and setting the amount of the binder pitch to 30 parts by weight and measured for the above-described physical properties. Subsequently, a polar plate (negative electrode sheet) and a nonaqueous secondary battery were produced and measured for the "charge/discharge irreversible capacity in the initial cycle" and "charge acceptance" in the same manner as in Example 1. Physical properties of the composite graphite particle are shown in Table 1, and the measurement results of the charge/discharge irreversible capacity in the initial cycle are shown in Table 2.

Comparative Example 3

A graphite particle having an average particle diameter of 100 μm was subjected to a spheroidization treatment by using Hybridization System Model NHS-3 manufactured by Nara Machinery Co., Ltd. at a rotor peripheral speed of 65 m/sec for 15 minutes to obtain a spherical graphite particle having a cumulative 50% diameter of 22.2 μm, a cumulative 10% diameter of 14.9 μm, a cumulative 90% diameter of 35.4 μm, and a Tap density of 1.02 g/cm$^3$. A composite graphite particle was obtained in the same manner as in Example 1 except for using the spherical graphite particle obtained above, using a binder pitch having a softening point of 88° C. as a graphitizable binder, setting the amount of the binder pitch to 30 parts by weight and setting the rotation speed of the pulverization blade to 7,800 revolutions/min and measured for the above-described physical properties. Subsequently, a polar plate (negative electrode sheet) and a nonaqueous secondary battery were produced and measured for the "charge/discharge irreversible capacity in the initial cycle" and "charge acceptance" in the same manner as in Example 1. Physical properties of the composite graphite particle are shown in Table 1, and the measurement results of the charge/discharge irreversible capacity in the initial cycle are shown in Table 2.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2008-166526) filed on Jun. 25, 2008, the contents of which are incorporated herein by way of reference.

INDUSTRIAL APPLICABILITY

By using the composite graphite particle of the present invention, a negative electrode for secondary batteries, ensur-

TABLE 1

| No. | BET-Specific Surface Area ($m^2/g$) | Tap Density ($g/cm^3$) | Average Degree of Circularity from 1.5 to 10 μm | Average Degree of Circularity from 10 to 40 μm | Particle Diameter of Composite Graphite Particle/Particle Diameter of Spherical Graphite Particle d50(B)/d50(A) | d90(B)/d90(A) | d10(B)/d10(A) | XRD z = y/x |
|---|---|---|---|---|---|---|---|---|
| Example 1 | 2.9 | 1.00 | 0.92 | 0.89 | 1.2 | 1.2 | 1.3 | 2.2 |
| Example 2 | 2.6 | 1.01 | 0.91 | 0.88 | 1.1 | 1.2 | 1.2 | 1.8 |
| Example 3 | 3.2 | 0.95 | 0.93 | 0.87 | 1.7 | 2.0 | 1.6 | 2.8 |
| Example 4 | 3.7 | 0.95 | 0.91 | 0.88 | 1.5 | 1.6 | 1.4 | 2.8 |
| Example 5 | 4.1 | 0.92 | 0.92 | 0.88 | 1.4 | 1.5 | 1.4 | 2.3 |
| Comparative Example 1 | 4.8 | 1.14 | 0.94 | 0.92 | 1.0 | 1.0 | 0.9 | 0.9 |
| Comparative Example 2 | 5.8 | 0.86 | 0.92 | 0.87 | 0.8 | 0.9 | 0.7 | 1.0 |
| Comparative Example 3 | 6.6 | 0.79 | 0.92 | 0.87 | 0.7 | 0.8 | 0.6 | 0.9 |

| No. | Specific Surface Area Hg Porosimetry r = p/q | Ratio of Polar Plate p'/q' | Physical Properties of Spherical Graphite Particle d50 | d10 | d90 | BET-Specific Surface Area ($m^2/g$) | Tap Density ($g/cm^3$) |
|---|---|---|---|---|---|---|---|
| Example 1 | 1.5 | 1.8 | 10.6 | 6.7 | 16.0 | 8.5 | 0.77 |
| Example 2 | 1.5 | 1.8 | 10.6 | 6.7 | 16.0 | 8.5 | 0.77 |
| Example 3 | 1.3 | 2.2 | 10.6 | 6.7 | 16.0 | 8.5 | 0.77 |
| Example 4 | 1.3 | 2.3 | 10.6 | 6.7 | 16.0 | 8.5 | 0.77 |
| Example 5 | 1.3 | 2.0 | 10.6 | 6.7 | 16.0 | 8.5 | 0.77 |
| Comparative Example 1 | — | — | 17.4 | 11.9 | 26.4 | 6.6 | 1.04 |
| Comparative Example 2 | 0.7 | 1.3 | 22.2 | 14.9 | 35.4 | 5.4 | 1.02 |
| Comparative Example 3 | 0.6 | 1.2 | 22.2 | 14.9 | 35.4 | 5.4 | 1.02 |

TABLE 2

| No. | Initial Charge/Discharge Irreversible Capacity (mAh/g) | Charge Acceptance (mAh/g) 0.05 C | Charge Acceptance (mAh/g) 0.2 C | Cycle Retention Ratio (%) (Electrode Density: 1.80 $g/cm^3$) 10 Cycles | 50 Cycles | 100 Cycles |
|---|---|---|---|---|---|---|
| Example 1 | 28 | 311 | 141 | 98 | 94 | 91 |
| Example 2 | 27 | 312 | 130 | 97 | 93 | 89 |
| Comparative example 1 | 33 | 278 | 129 | 96 | 90 | 82 |
| Comparative Example 2 | 38 | 280 | 121 | 96 | 91 | 84 |
| Comparative Example 3 | 39 | 290 | 125 | 95 | 90 | 83 | ing that when a nonaqueous secondary battery is fabricated, the irreversible charge/discharge capacity in the initial cycle is small and the charge acceptance and cycle characteristics are excellent, and a nonaqueous secondary battery can be stably and efficiently produced. Therefore, the present invention is industrially very useful in the field of various nonaqueous secondary batteries.

The invention claimed is:

1. A composite graphite particle (B), obtained by forming a composite comprising:
 a spherical graphite particle (A); and
 a graphitized product of graphitizable binder,
 wherein said composite graphite particle (B) satisfies at least one of (a) and (b):
 (a) a cumulative 50% diameter (d50 size), 90% diameter (d90 size) and 10% diameter (d10 size) of the spherical graphite particle (A) laser diffraction are represented by D50(A), D90(A) and D10(A), respectively, and the cumulative 50% diameter (d50 size), 90% diameter (d90 size) and 10% diameter (d10 size) of the composite graphite particle (B) by laser diffraction are represented by D50(B), D90(B) and D10(B), respectively, and the composite graphite particle satisfies all of (formula 1), (formula 2) and (formula 3):

$1.1 \leq D50(B)/D50(A) \leq 2.0$ (formula 1), $1.1 \leq D90(B)/D90(A) \leq 2.4$ (formula 2), $1.0 \leq D10(B)/D10(A) \leq 1.8$ (formula 3); and (b) a value of $110_{(A)}/004_{(A)}$ which is the ratio between 110 plane and 004 plane measured from XRD of the spherical graphite particle (A) is represented by x, and a value of $110_{(B)}/004_{(B)}$ which is the ratio between 110 plane and 004 plane measured from XRD of the composite graphite particle (B) is represented by y, and a ratio y/x is from 1.2 to 3.5.

2. The composite graphite particle of claim 1, wherein said composite graphite particle (B) further satisfies at least one of (c) and (d):
 (c) a BET specific surface area is from 1.6 to 5.0 m²/g, a tap density is from 0.80 to 1.40 g/cm³, an average degree of circularity in a particle diameter range of 1.5 to 10 μm measured by a flow-type particle image analyzer is from 0.90 to 0.98, and an average degree of circularity in a particle diameter range of 10 to 40 μm is from 0.85 to 0.90; and
 (d) a value of the entire pore volume obtained by Hg porosimetry measurement of the spherical graphite particle (A) is represented by p, and a value of an entire pore volume obtained by Hg porosimetry measurement of the composite graphite particle (B) is represented by q, and p/q is from 0.5 to 1.0.

3. The composite graphite particle of claim 2, wherein when a binder is added to said composite graphite particle (B), giving a mixture, and the mixture is coated on a metal current collector, dried to give a binder-comprising active material layer on the metal current collector, and pressed to set an electrode density to 1.63 g/cm³ or more,
 a value p'/q' obtained by dividing a value p' of BET-specific surface area after pressing the binder-containing active material layer formed on the metal current collector by a value q' of BET-specific surface area before pressing the binder-containing active material layer formed on the metal current collector is from 1.5 to 2.5.

4. The composite graphite particle of claim 2, wherein at least (c) is satisfied.

5. The composite graphite particle of claim 2, wherein at least (d) is satisfied.

6. The composite graphite particle of claim 2, wherein both (c) and (d) are satisfied.

7. The composite graphite particle of claim 1, wherein when a binder is added to said composite graphite particle (B), giving a mixture, and the mixture is coated on a metal current collector, dried to give a binder-comprising active material layer on the metal current collector, and pressed to set an electrode density to 1.63 g/cm³ or more,
 a value p'/q' obtained by dividing a value p' of BET-specific surface area after pressing the binder-containing active material layer formed on the metal current collector by a value q' of BET-specific surface area before pressing the binder-containing active material layer formed on the metal current collector is from 1.5 to 2.5.

8. The composite graphite particle of claim 1, wherein at least (a) is satisfied.

9. The composite graphite particle of claim 1, wherein at least (b) is satisfied.

10. The composite graphite particle of claim 9, wherein y/x is from 1.8 to 3.5.

11. The composite graphite particle of claim 9, wherein y/x is from 2.2 to 3.5.

12. The composite graphite particle of claim 9, wherein y/x is from 2.3 to 3.5.

13. The composite graphite particle of claim 1, wherein both (a) and (b) are satisfied.

14. The composite graphite particle of claim 1, wherein the cumulative 50% diameter (d50 size) of the spherical graphite particle (A) by laser diffraction is from 9 to 13.5 μm.

15. A nonaqueous secondary battery, comprising the composite graphite particle (B) of claim 1.

16. A negative electrode material, comprising the composite graphite particle (B) of claim 1.

17. The negative electrode material of claim 16, which further comprises a carbonaceous particle differing in a shape or physical property from said composite graphite particle (B).

18. A negative electrode comprising:
 a current collector; and
 an active material layer formed on the current collector, wherein said active material layer is formed with the negative electrode material of claim 16.

19. A nonaqueous secondary battery, comprising:
 a positive electrode, and
 a negative electrode, capable of storing and releasing a lithium ion and an electrolyte,
 wherein said negative electrode is the negative electrode of claim 18.

* * * * *